(12) United States Patent
Brown

(10) Patent No.: US 10,911,440 B2
(45) Date of Patent: *Feb. 2, 2021

(54) TIMING ARRAY AS CREDENTIALS

(71) Applicant: Roland R. Brown, Ogden, UT (US)

(72) Inventor: Roland R. Brown, Ogden, UT (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/189,815

(22) Filed: Nov. 13, 2018

(65) Prior Publication Data

US 2019/0081941 A1    Mar. 14, 2019

Related U.S. Application Data

(63) Continuation of application No. 15/285,280, filed on Oct. 4, 2016, now Pat. No. 10,129,245.

(51) Int. Cl.
*H04L 29/06* (2006.01)
*G06F 21/31* (2013.01)

(52) U.S. Cl.
CPC .......... *H04L 63/083* (2013.01); *G06F 21/316* (2013.01); *H04L 63/0861* (2013.01); *H04L 63/102* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 8,533,815 B1* | 9/2013 | Upson | ................... | H04L 9/3231 |
| | | | | 726/19 |
| 2004/0054929 A1* | 3/2004 | Serpa | ...................... | G06F 21/31 |
| | | | | 726/5 |
| 2012/0317640 A1* | 12/2012 | Hammoud | ........... | G06F 21/316 |
| | | | | 726/19 |
| 2013/0343616 A1* | 12/2013 | Forero | ............... | G06K 9/00335 |
| | | | | 382/115 |
| 2014/0173286 A1* | 6/2014 | Novak | .................. | G06F 21/316 |
| | | | | 713/176 |

* cited by examiner

*Primary Examiner* — William J. Goodchild
(74) *Attorney, Agent, or Firm* — David R. Conklin; Kirton McConkie

(57) ABSTRACT

A multi-dimensional approach can be used to verify a password. In addition to requiring the input of the correct password, the timing at which the characters of the password are input can be determined and compared to stored timing values. Even if the correct password is input, authentication can still fail if the characters of the password are not input in accordance with a required timing.

14 Claims, 12 Drawing Sheets

1000

Username = user12345;

Password = 12345;

Timing array for sequence of six characters = {0, 250, 500, 750, 1000, 1250}; 1001

*FIG. 10*

TIMING ARRAY AS CREDENTIALS

This application is a continuation of application Ser. No. 15/285,280, filed Oct. 4, 2016, and entitled TIMING ARRAY AS CREDENTIALS. This application claims priority to and incorporates herein by reference the above-referenced application in its entirety.

BACKGROUND

Security of personal and corporate information is one of the defining problems of this century. Unauthorized access to personal and corporate information costs individuals and companies billions of dollars each year and is eroding the general public's trust in electronic commerce. As the industry searches for new and more effective methods to stop these intrusions, it seems clear that for the foreseeable future they simply cannot be stopped. Many systems are adding additional layers of security by including a "Secret Question" or picture in the login process. While effective, many institutions are highly concerned about customer inconvenience which weighs heavily in the balance of security issues. In fact, many service providers are willing to accept millions of dollars of losses rather than inconvenience their customers.

BRIEF SUMMARY OF THE INVENTION

The present invention extends to methods, systems, and computer program products for using the timing of input to verify a password. In other words, the present invention provides a multi-dimensional approach to verify a password. As with many authentication scenarios, the present invention can require the input of credentials such as a username and password. However, unlike traditional authentication scenarios, in addition to requiring the input of the correct credentials, the present invention can also require the input of the password using appropriate timing intervals between each character of the password. This added dimension of password verification can greatly increase the security of a system while adding very little burden on the user.

As used herein, the term "password" is understood to include any combination or arrangement of letters, numbers, and/or special characters. This term is further understood to include any spatial pattern that may be entered via a touch-screen, touch-sensing display, and/or touchpad of a computing device, including but not limited to a swipe pattern, a tap pattern, a pressure pattern, and/or any combination thereof.

In one embodiment, the present invention is implemented as a method for authenticating user credentials. Input user credentials are received which include a password and timing information. The timing information defines a time when individual characters of the password were input. Stored user credentials are accessed which include a stored password and stored timing information. The stored timing information defines a required time when individual characters of the stored password must be input. The timing information of the input user credentials is compared to the stored timing information to determine whether the individual characters of the password were input in accordance with the stored timing information. Upon determining that the individual characters of the password were input in accordance with the stored timing information, the input user credentials are authenticated.

In another embodiment, the present invention is implemented as a method for generating timing information for a password. User input of a password is received. The password comprises a plurality of characters. While the password is input, it is determined when each of the plurality of characters is input. Timing information is generated which defines when each of the plurality of characters was input.

In another embodiment, the present invention is implemented as a server system or systems that is configured to implement a method for authenticating a user. The server system receives, from a first user interface displayed on a first client computing device, a first username, a first password, and first timing information defining when each character of the first password was input into the first user interface by a user. The server system stores the first username, first password, and first timing information as user credentials for the user for authenticating with the server system. The server system receives, from another user interface displayed on a second client computing device, a second username, a second password, and second timing information defining when each character of the second password was input into the second user interface by the user. The server system compares the second username, the second password, and the second timing information to the first username, the first password, and the first timing information. The server system, upon determining that the second username, the second password, and the second timing information match the first username, the first password, and the first timing information, authenticates the user.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10 illustrates a diagram featuring a data structure;

DETAILED DESCRIPTION OF THE INVENTION

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Figure 1:
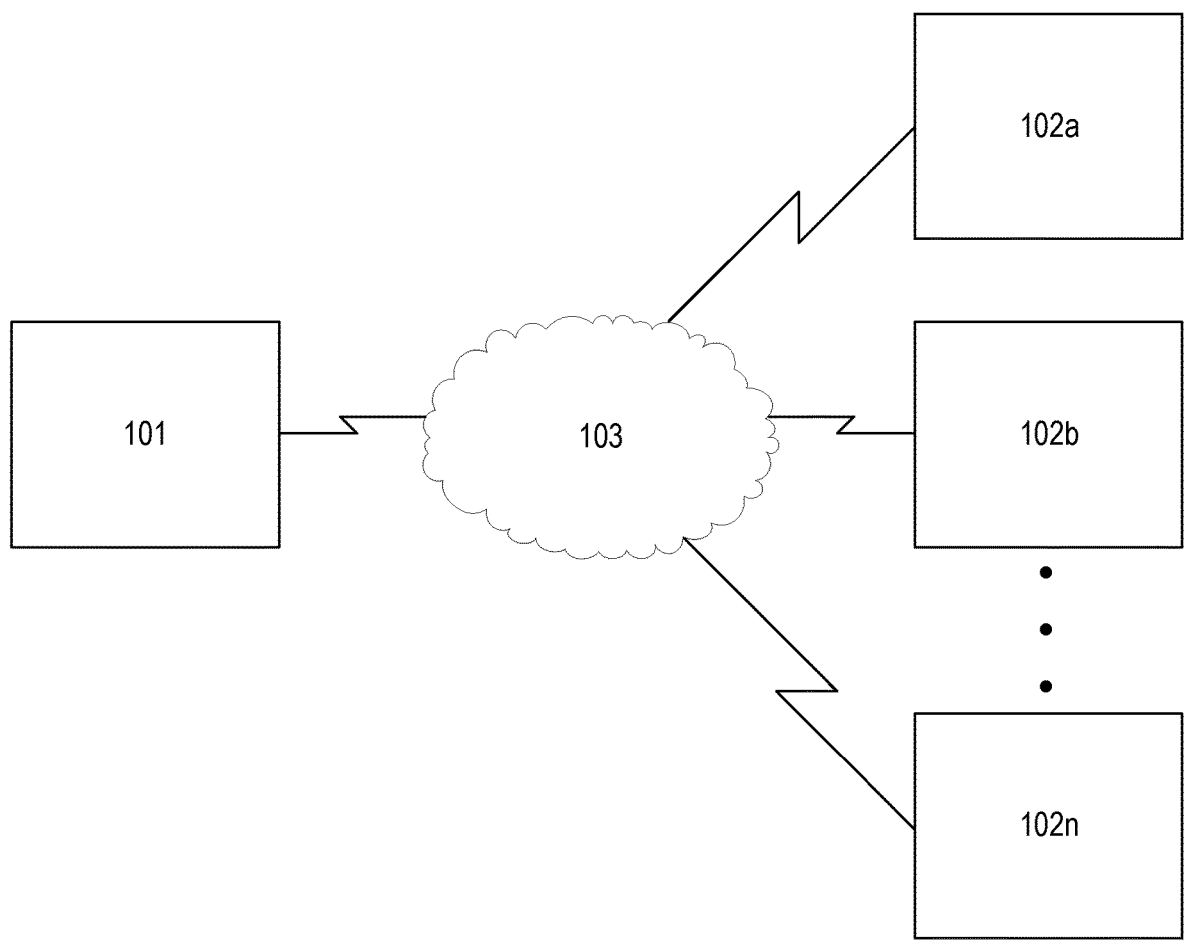
FIG. 1 illustrates an example computing environment in which the present invention can be implemented.

FIG. 1 illustrates an example computer environment 100 in which the present invention can be implemented. Computer environment 100 includes a server system 101 and a number of client computing devices 102a-102n which are interconnected via a network 103. Server system 101 can represent a system that provides access to a user's information where such access is controlled by an authentication process. In this specification, an authentication process should be construed as any process that requires a user to input secret credentials to obtain access to information or functionality. Typically, these credentials are in the form of a username and password. However, the present invention can be implemented whenever any type of credentials are required as long as the credentials include a password (e.g., the combination of biometric information and a password). A password should be construed broadly to include any sequence of characters including letters, numbers, symbols, etc. that serve as a form of proof of a user's identity.

Client computing devices 102a-102n can represent any type of computing device that is capable of communicating with server system 101 and of receiving user input of credentials. For example, client computing devices 102a-102n can include personal computers, mobile phones, kiosks, touch screen displays, keypads, etc. Network 103 can typically be the internet; however, any network connection can be employed to enable communication between server system 101 and client computing devices 102a-102n including local network connections.

In addition to the client/server environment depicted in FIG. 1, the present invention can be implemented entirely within a single device. For example, any of client computing devices 102a-102n can be configured to require user input of credentials in order to access functionality of the device such as to login to a personal computer or bypass a lock screen of a mobile device (in which case, the required credentials may only be a password). In such cases, the input and verification of a password can be performed entirely by a single device (or directly connected devices) without requiring any communication across network 103. Accordingly, the present invention can be implemented in any computing environment which requires input of a password regardless of the number or type of computing devices involved.

Figure 2:
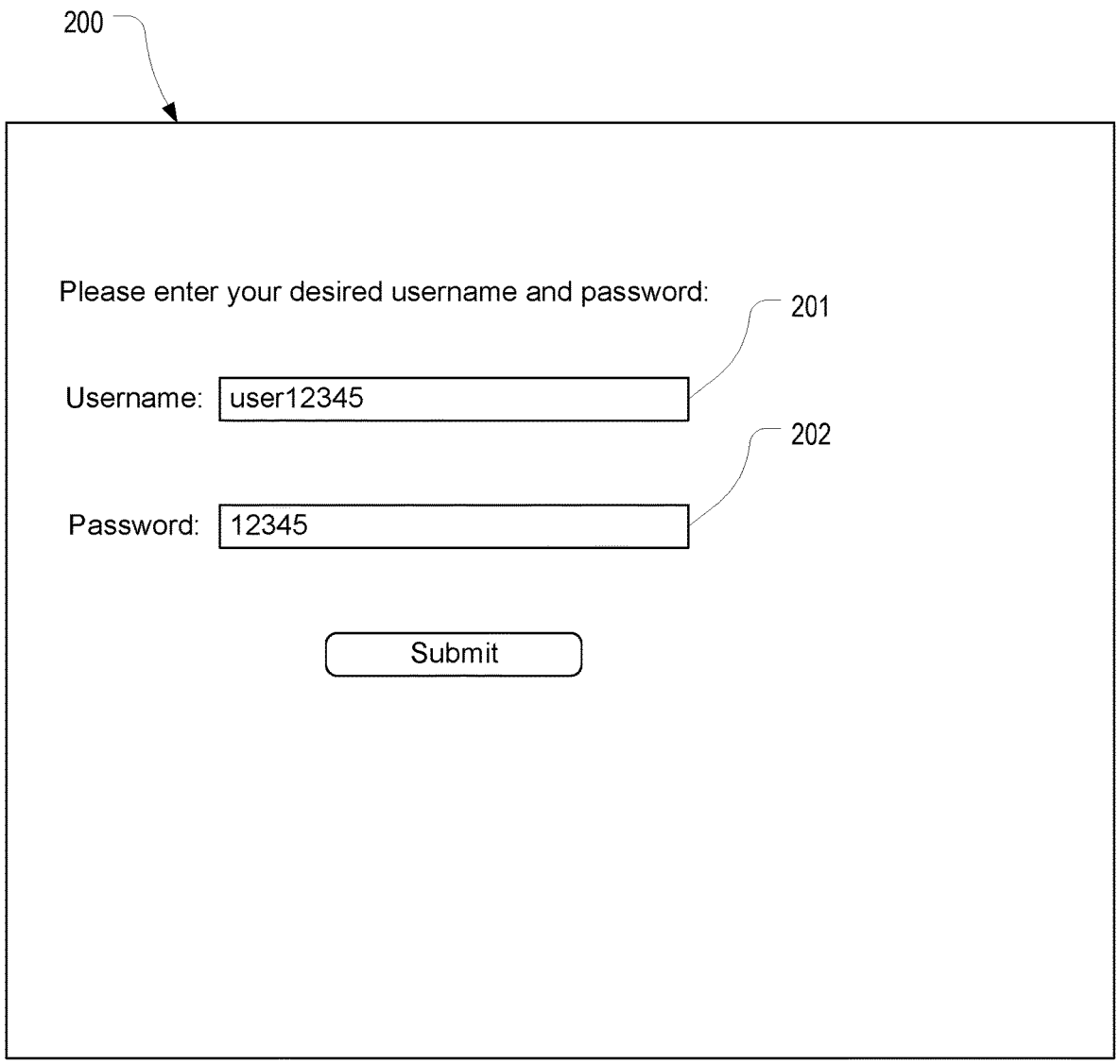
FIG. 2 illustrates an example user interface that can be displayed to a user to allow the user to establish credentials.

FIG. 2 illustrates an example user interface 200 that can be displayed to a user to allow the user to establish credentials in accordance with one or more embodiments of the invention. For example, user interface 200 can represent a webpage that is sent by server system 101 to client computing device 102a to allow a user of client computing device 102a to create a username and password for accessing information and/or functionality provided by server system 101. User interface 200 may also represent a screen displayed by client computing device 102a to allow the user to create a username and password for logging into the device.

As shown in FIG. 2, user interface 200 includes a username field 201 and a password field 202. Fields 201 and 202 can be configured as text boxes or other suitable user interface elements that allow the user to input characters defining a desired username and password. In accordance with embodiments of the present invention, user interface 200 can be configured to record when individual characters are input into password field 202. For example, user interface 200 can use a timer to identify when the user inputs each character of a password. After the username and password have been input and the user clicks submit, the username and password as well as the timing information (collectively "multidimensional credentials") can be stored on server system 101 and/or one or more other systems with which server system 101 communicates. In some embodiments, the timing information can be stored separately from the password (e.g., on a different system or in a different data structure) to increase the security of the system.

Figure 3:
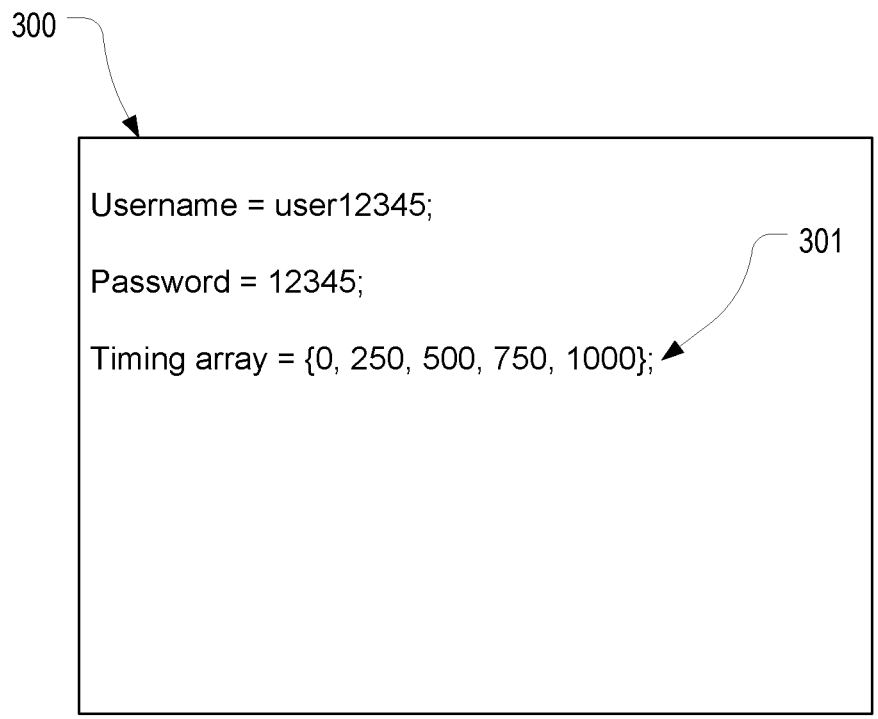
FIG. 3 illustrates an example data structure for storing user credentials that include timing information.

In this example, the user has entered a username of "user12345" and a password of "12345". It will also be assumed that the user entered the five characters of the password with a duration of 250 milliseconds between each character. FIG. 3 illustrates an example data structure 300 that can be created to store the multidimensional credentials. Data structure 300 includes the username (user12345), the password (12345), and a timing array 301 that defines the timing information associated with the password.

Timing array 301 includes five entries with each entry corresponding to a particular character of the password. The first entry is 0 indicating that the first character of the password, which in this case is "1", was entered at time 0 ms. It is noted that timing array 301 could not include this first entry if a 0 value is always used for the first character. Timing array 301 is therefore used for explanation purposes and should not be construed as requiring any particular format for the storage of the timing information. Any suitable structure and/or format can be used to store the timing information as long as it is sufficient to identify a duration of time between each character. It is also noted that data structure 300 is for illustrative purposes only. In a typical implementation, the different components of the multidimensional credentials would likely be stored in separate locations.

The second entry in timing array 301 is 250 indicating that the second character, which in this case is "2", was entered at time 250 ms. Rather than employ absolute values for each entry, relative values could be used. For example, the 250 ms could represent an absolute time (i.e. the value of the timer) when the second character was input, or could represent the amount of time between the input of the first and second characters (which happens to be the same 250 ms value in this example). The third through fifth entries in timing array 301 are 500, 750, and 1000 respectively indicating that the third through fifth characters of the password were input at times 500 ms, 750 ms, and 1000 ms respectively. If relative values were employed to define the duration of time between each character, timing array 301 could instead store values of {250, 250, 250, 250} indicating that each character was input 250 ms after the preceding character. In some embodiments, server system 101 can receive timing information in one format and translate into another format prior to storing or otherwise using the timing information. For example, client computing device 102a may generate timing information using absolute values while server system 101 may store timing information as relative values. In such a case, server system 101 may translate the absolute values into relative values prior to storing or using the timing information.

Once the multidimensional credentials have been established, they can be used to validate a user's subsequent attempt to authenticate. As with typical authentication schemes, the user is required to enter the username of "user12345" and the password of "12345" to authenticate. However, the user will additionally be required to input the characters of the password with the appropriate timing. In other words, for the user to successfully authenticate, the user will be required to input each of the second through fifth characters of the password 250 ms after the previously input character.

To identify the timing of the input of the characters during an authentication attempt, a similar process as described above can be performed. For example, a user interface in which the username and password are input can be configured to use a timer to identify when each character is input and store corresponding timing information. The input username, password, and timing information can be sent to server system 101 for verification against the stored multidimensional credentials.

Figure 4:
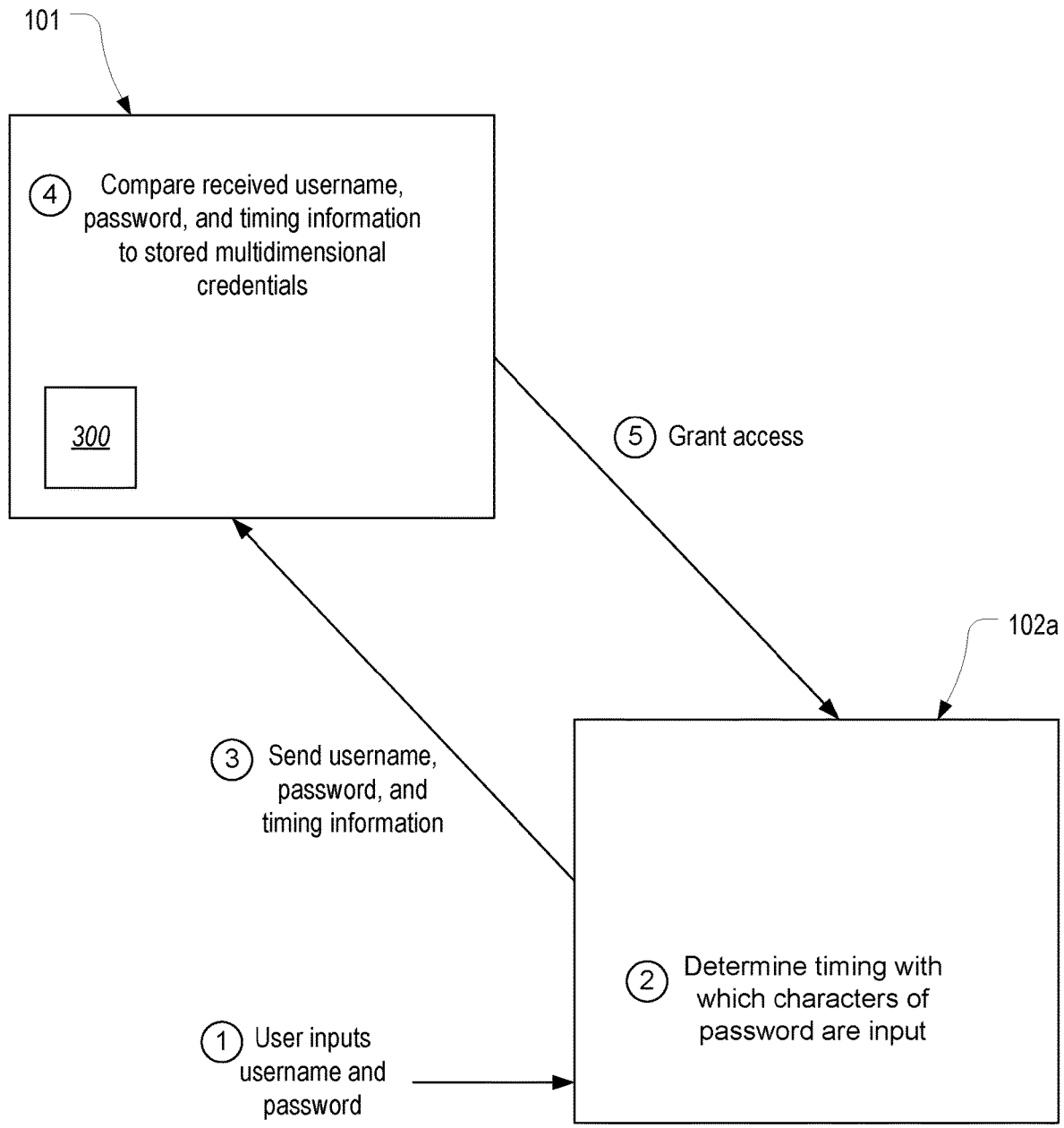
FIG. 4 illustrates a flowchart of a verification process that can be implemented when a user employs a client computing device to authenticate with a server system.

FIG. 4 illustrates a flowchart of how this verification process could be implemented when a user employs client computing device 102a to authenticate with server system 101 (e.g., via interaction with a webpage or dedicated application). As shown, server system 101 stores data structure 300 which includes the user's multidimensional credentials which are required for authenticating with server system 101. Alternatively, at least some of the components of the multidimensional credentials could be stored on another computing system which is accessible to server system 101 in which case server system 101 may retrieve the credentials from the other system or request verification of the credentials by the other system.

In step 1, the user inputs a username and password on client computing device 102a. Client computing device 102a (or more particularly, a web browser or application executing on client computing device 102a) receives the input of the username and password. In step 2, which can be performed concurrently with step 1, client computing device 102a determines the timing with which the characters of the password are input. Step 2 can be performed in a similar manner as described above. For example, client computing device 102a can determine absolute or relative values representing when each character is input.

In step 3, client computing device 102a sends the input username and password and the determined timing information to server system 101. For example, this information can be sent in response to the user clicking a submit button in a user interface in which the username and password are input.

In step 4, server system 101 accesses the stored multidimensional credentials and compares the received username, password, and timing information to the multidimensional credentials. As with standard authentication processes, for the user to be authenticated, the received username and password must match the stored username and password. However, in accordance with the present invention, the received timing information must also match the stored timing information for authentication to succeed.

In step 5, if the received username, password, and timing information matches the stored multidimensional credentials, server system 101 can grant access to the user of client computing device 102a. This multidimensional matching requirement therefore greatly increases the security of the authentication process because merely knowing the username and password is not sufficient. Even if an individual, such as a hacker, were to obtain a user's username and password, the individual still would not be able to obtain unauthorized access due to the additional requirement that the password must be entered using the appropriate timing. With virtually unlimited possibilities for the timing, it would be extremely difficult for the individual to correctly guess the required timing.

Figure 5:
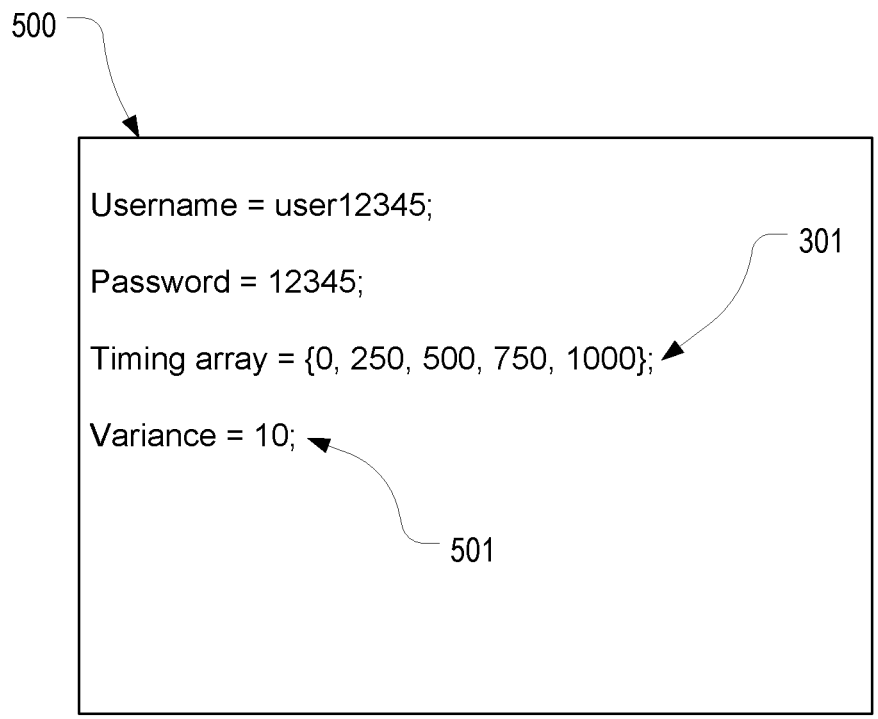
FIG. 5 illustrates another example data structure for storing user credentials that include timing information and a variance parameter.

Because it would be difficult for a user to input a password with the exact timing as was used when the user originally established his multidimensional credentials, server system 101 can employ a variance parameter to allow slight variations in timing to be considered as matching. For example, FIG. 5 illustrates a data structure 500 that is similar to data structure 300 but includes a variance parameter 501. Variance parameter 501 is set to a value of 10 ms meaning that a match can be found if a character was input within 10 ms of the required value.

For example, if during an authentication attempt, the user input the appropriate password of "12345" using a timing sequence of 0, 240, 505, 748, 1009, the input of the password would still be considered as matching because the timing at which the user input each character of the password falls within the variance. In other words, as long as a character is input within the 20 ms window (i.e., 10 ms before and 10 ms after the required time), the character can be deemed as having been input in accordance with the required timing.

In some embodiments, the value of the variance parameter can be a configurable option. For example, the host of a website (e.g., a company) can specify a desired variance for users of the website. If the website provides access to highly sensitive information (e.g., a banking website), the variance may be set to a lower value whereas if the website provides access to less sensitive information (e.g., an entertainment website), the variance may be set to a higher value.

The use of the variance parameter therefore can further increase the security of a system. For example, it may be common for a user to employ a popular or favorite tune as the timing for inputting a password. Because each user may "reproduce" the tune in a different manner (e.g., one user may sing a tune at a slightly faster rate than another user may sing the same tune, or one user may modify the beat of the tune), even knowing the tune on which the timing of the password may be based still may not be sufficient if the required variance is low. As an example, a user may employ the six beat sequence of the song "Duke of Earl" for the password timing, but may use a faster tempo than is employed in the actual song. In such a case, even if an individual discovered the user's username and password and knew the timing for the password was based on "Duke of Earl," the individual may still not be able to obtain access using the credentials without knowing the tempo at which the user created the password. Setting the variance parameter to a small value can therefore make unauthorized access extremely difficult since each user reproduces a tune in a somewhat unique way.

In some embodiments, the user may be given the ability to set the value of the variance parameter. For example, a user may not want to be precise in his timing when he inputs a password but may still desire the added security provided by multidimensional credentials. In such cases, the user can specify a higher value for the variance parameter. Providing the user with this option can be suitable when the password serves as a means to obtain access to the local device (e.g., when the password is used to login to a computer or to bypass the lock screen of a mobile device).

In some embodiments, when the user is establishing the password, the user can be prompted to input the password multiple times. In such cases, the multiple sets of timing information that would be created can be treated in various ways to generate the required timing information of the multidimensional credentials. In some cases, the multiple sets of timing information can be averaged to generate a single set of timing information. For example, when establishing credentials, if the user inputs the password three times, the following sets of timing information may be generated: {0, 248, 503, 751, 1009}, {0, 251, 499, 758, 999}, and {0, 239, 495, 747, 992}. The sets could then be averaged to yield the following set: {0, 246, 499, 752, 1000}. This set could then be used as the timing information of the multidimensional credentials stored for the user.

In cases where multiple sets are averaged, a separately defined variance parameter may be used as described above. However, in some embodiments which employ an average, a variance parameter can be generated for each character of the password based on the values in the multiple sets of timing information. For example, for the second character, a variance parameter may be defined that has a value of 7 since the largest variance between the average (246) and a value in the sets is 7 ms (246−239=7). Therefore, in this example, if the second character of a subsequently input password is input within 7 ms of 246 ms, the second character will be deemed as having been input at the appropriate time. Similarly, for the fourth character, a variance parameter may be defined that has a value of 6 since the largest variance between the average (752) and a value in the sets is 6 ms (758−752=6).

Alternatively, rather than averaging the values, the minimum and maximum values found in the sets could be used to generate a range for each value. For example, using the same three sets as above, the following timing information could be generated: {0, 239-251, 495-503, 747-758, 992-1009}. In such instances, a subsequently input password would be authenticated if the characters of the password were input at times that fall within the defined ranges. A separately defined variance parameter may not be necessary in such cases since a range is already defined. However, in some embodiments, a variance parameter may also be provided which, in essence, would widen the range of acceptable values. For example, if a variance parameter of 5 is provided, the input of the second character of the password at a time of 234 ms would still be deemed as acceptable since it falls within 5 ms of the defined range.

In some embodiments, server system 101 may be configured to adjust the timing information it stores for a particular user as a form of machine learning. As described above, server system 101 may initially create a data structure that stores a user's multidimensional credentials. Once the user's multidimensional credentials have been created, server system 101 may monitor timing information provided during the user's subsequent login attempts. If server system 101 identifies a pattern in the timing information provided during the subsequent login attempts that deviates from the timing information in the stored multidimensional credentials, server system 101 can modify the stored timing information to match the new pattern. In this way, server system 101 can adapt the stored timing information to the timing at which the user is currently inputting the password thereby accounting for any changes in timing that may occur over time.

As an example, data structure 500 initially defines that a duration of 250 ms should exist between each character of user12345's password and that a variance of up to 10 ms would be acceptable. Then, at a later time, if it were detected that user12345 consistently inputs the last character 240 ms after the fourth character, server system 101 could automatically update timing array 301 to define a duration of 240 ms between the fourth and last characters (e.g., timing array 301 could be updated to {0, 250, 500, 750, 990}). With this update, the variance of 10 ms would still apply so that the last character would be accepted as long as it was input between 230 and 250 ms after the fourth character.

Server system 101 can be configured to identify that a changed pattern in the timing information exists after a threshold number of login attempts include the changed pattern. For example, if during three consecutive login attempts user12345 inputs the last character 240 ms after the fourth character, server system 101 can determine that a change in the pattern has occurred and therefore can update timing array 301 as described above.

Although this example assumes a consistent change in the pattern (i.e., the last character is consistently input exactly 240 ms after the fourth character), server system 101 may employ a similar variance parameter to determine whether a change in the timing pattern has occurred. For example, if user12345, during consecutive login attempts, inputs the last character with durations of 240 ms, 241 ms, and 242 ms after the fourth character, and server system 101 employs a variance parameter of 2 ms for the purpose of detecting whether changed patterns in the timing information have occured, server system 101 may still determine that a change has occurred since 240 ms, 241 ms, and 242 ms are all within 2 ms of one another. In some embodiments, even a failed login attempt may still be considered in this determination. For example, if one of the consecutive login attempts included a duration of 239 ms between the fourth and last characters (which would lead to a failed attempt since 239 ms is outside of the 10 ms variance of 250 ms), server system 101, in some embodiments, may still consider this failed attempt when determining whether a change in the pattern has occurred.

In some embodiments, server system 101 may be configured to notify the user of a detected changed pattern in the timing information. For example, after a threshold number of consecutive login attempts have produced timing information matching the changed pattern, server system 101 may cause a popup window to be displayed on the user's device indicating the detected change. This window may ask the user to confirm whether the stored timing information should be adjusted to match the detected change. In this way, the user can control whether server system 101 makes changes to the stored timing information. Also, this can provide the user the opportunity to change how he or she inputs the password in the future so that it again matches the previously defined timing information.

Figure 6:
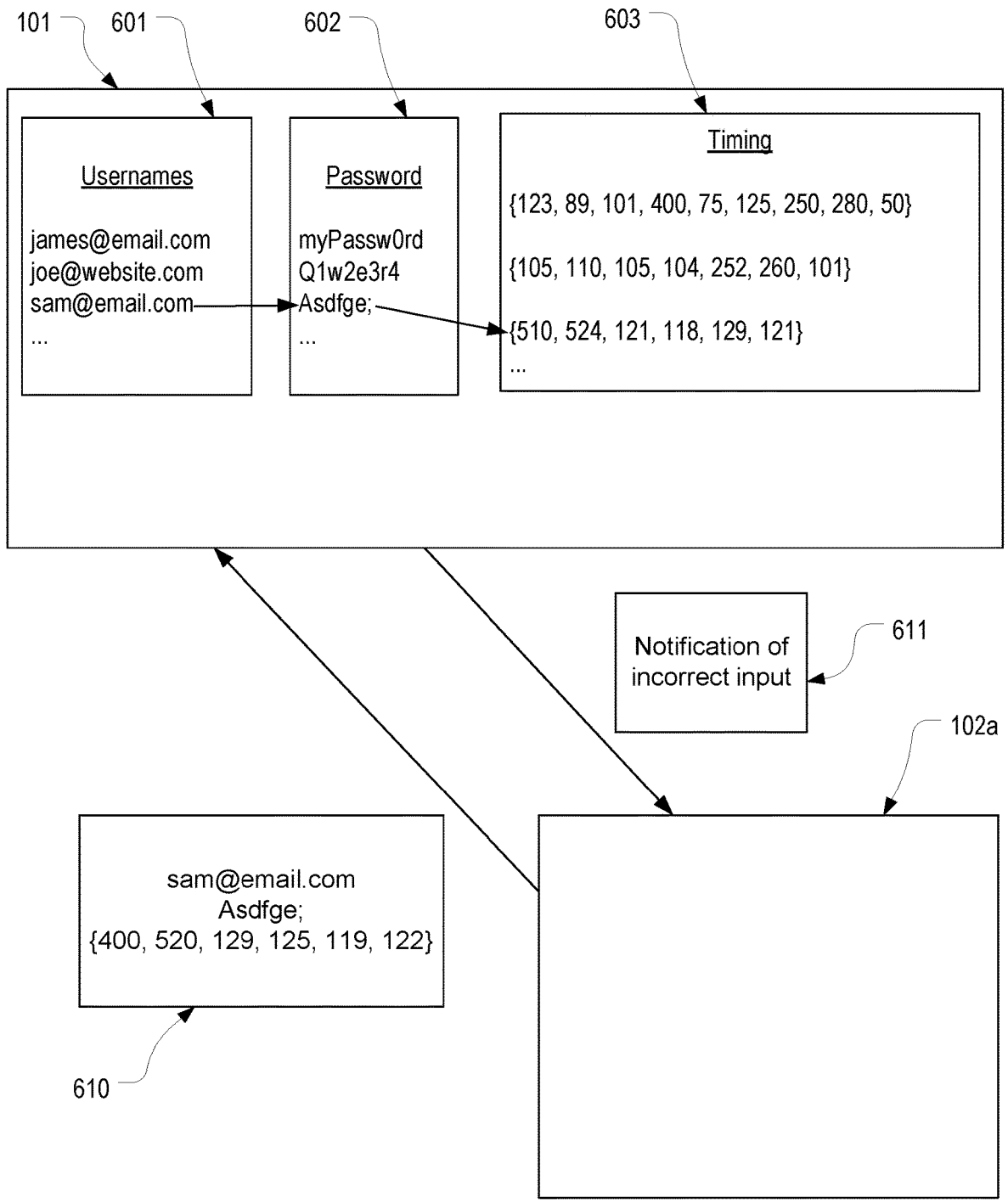
FIG. 6 illustrates another example of a process for verifying user input of a username and password against multidimensional credentials.

FIG. 6 illustrates another example of a process for verifying user input of a username and password against multidimensional credentials. In FIG. 6, a user of client computing device 102*a* is attempting to authenticate with server system 101. Server system 101 uses three separate data structures 601, 602, and 603 to store usernames, passwords, and timing information respectively for various users. Although not shown, it will be assumed that server system 101 employs a variance of 20 ms for determining if input timing information matches stored timing information. In this example, server system 101 stores the timing information as the duration of time in milliseconds between the input of adjacent characters. Accordingly, the timing information for each password includes one value less than the number of characters in the password.

As shown, client computing device 102*a* sends authentication request 610 which includes the username and password input by the user as well as the timing information that was generated based on when the user input the characters of the password. In this case, the values of the user input are "sam@email.com" for the username, "Asdfge;" for the password, and {400, 520, 129, 125, 119, 122} for the timing information.

Upon receiving authentication request 610, server system 101 uses the username contained in authentication request to identify a matching username in data structure 601. As represented by the arrow between data structure 601 and data structure 602, data structure 601 stores information that maps each listed username with the corresponding password in data structure 602. Accordingly, once the matching username is identified, server system 101 identifies the corresponding password in data structure 602 and compares it to the password contained in authentication request 610. Because the corresponding password matches the password in authentication request 610, server system 101 then identifies the corresponding timing information as represented by the arrow between data structure 602 and data structure 603.

Server system 101 then compares the corresponding timing information, which in this case is {510, 524, 121, 118, 129, 121} with the timing information in authentication request 610, which is {400, 520, 129, 125, 119, 122}. Because a variance of 20 ms is used, server system 101 will compare each value in the timing information contained in authentication request 610 to the corresponding value in the corresponding timing information in data structure 603 to determine whether the value is within 20 ms of the required value.

In this case, the first value in the timing information received from client computing device 102*a* indicates that the user input the second character of the password ("s") 400 ms after inputting the first character ("A"). However, the timing information stored in data structure 603 indicates that the second character must be input between 500 and 520 ms after the first character (i.e., 510 ms+/−10 ms). In other words, when inputting the password, the user input the second character too quickly after the first character. Server system 101 will therefore determine that authentication request 610 should be denied and can send communication 611 indicating that the user supplied incorrect input.

In summary, the present invention adds an additional dimension to the authentication process. Because this additional dimension is in the form of the timing of currently required input rather than as additional input, the present invention provides additional security without adding additional burden to the authentication process. This is in contrast to other techniques which increase security by requiring additional input such as the answering of security questions or the verification of a known image.

Further, because there are virtually unlimited possibilities for the timing information, the present invention renders brute force techniques for guessing user credentials ineffective. Accordingly, the present invention provides a highly secure authentication process that adds very little burden on the user.

Figure 7:
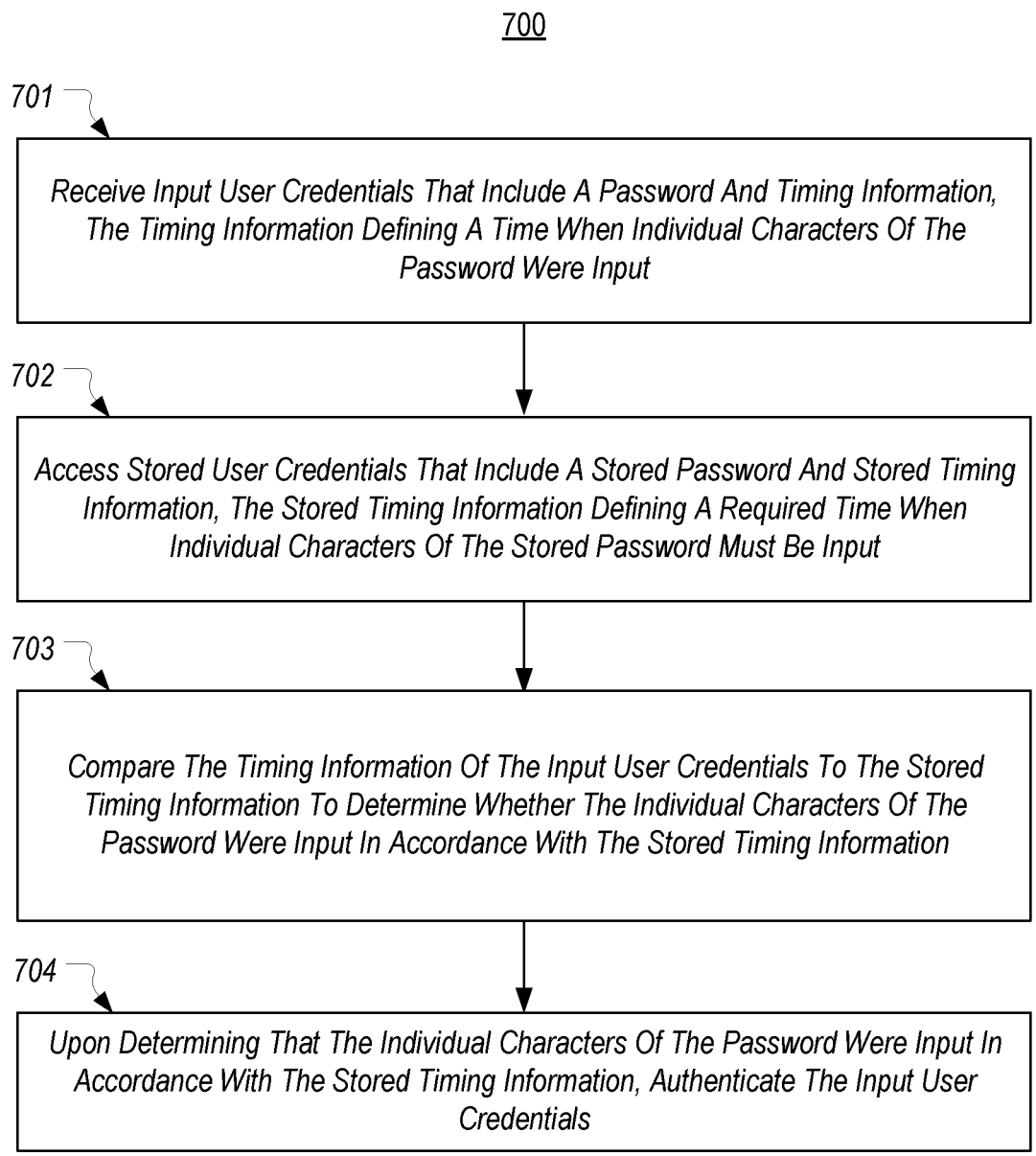
FIG. 7 illustrates a flowchart of an example method for authenticating user credentials.

FIG. 7 illustrates a flowchart of an example method 700 for authenticating user credentials. Method 700 will be described with reference to FIGS. 1-3 to provide a suitable example of how the method relates to the above description.

Method 700 includes an act 701 of receiving input user credentials that include a password and timing information. The timing information defines a time when individual characters of the password were input. For example, server system 101 can receive, from client computing device 102*a*, a username and password that a user input into client computing device 102*a* along with timing information generated by client computing device 102*a* while the user input the password. Alternatively, client computing device 102*a* can receive user input of a password and generate timing information from this input.

Method 700 includes an act 702 of accessing stored user credentials that include a stored password and stored timing information. The stored timing information defines a required time when individual characters of the stored password must be input. For example, server system 101 can access the contents of data structure 301. Alternatively, client computing device 102*a* can access the contents of data structure 300.

Method 700 includes an act 703 of comparing the timing information of the input user credentials to the stored timing information to determine whether the individual characters of the password were input in accordance with the stored timing information. For example, server system 101 or alternatively client computing device 102a can compare the received username and/or password and timing information to the contents of data structure 300.

Method 700 includes an act 704 of, upon determining that the individual characters of the password were input in accordance with the stored timing information, authenticating the input user credentials. For example, server system 101 or alternatively client computing device 102a can authenticate the user if the received username and/or password and timing information match the information stored in data structure 300.

Figure 8:
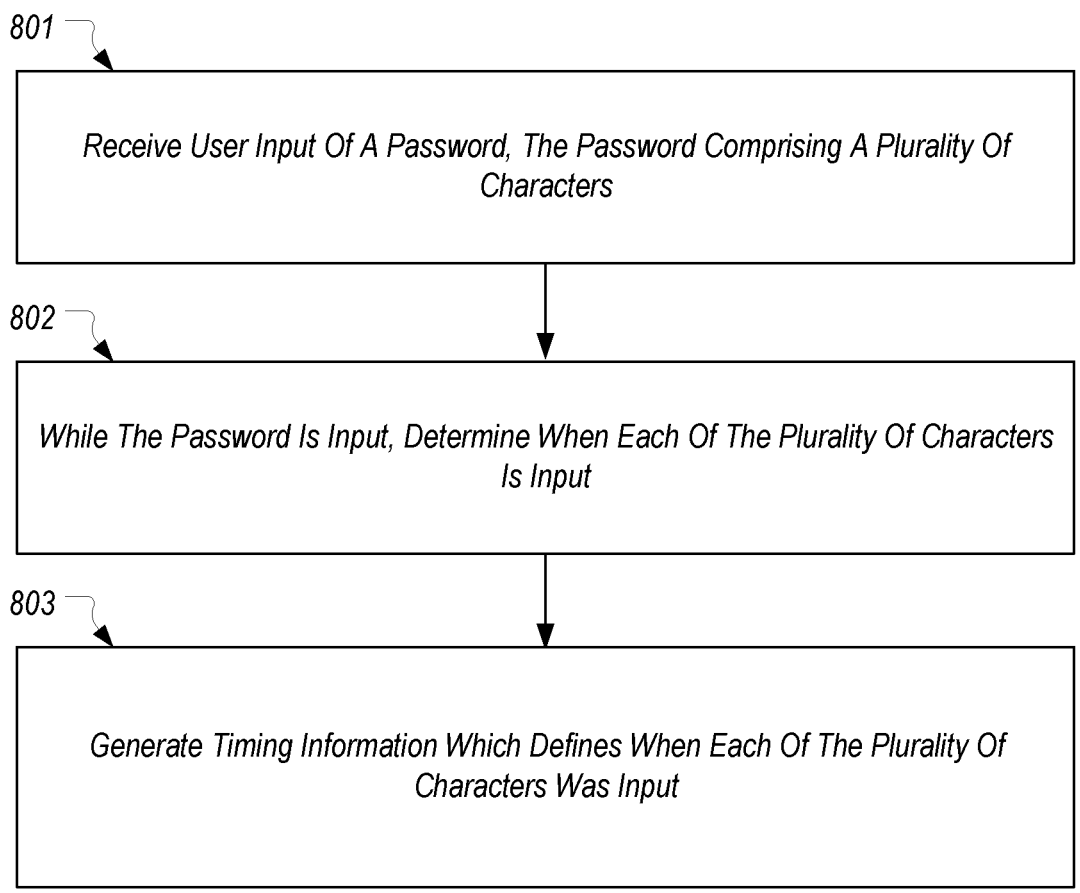
FIG. 8 illustrates a flowchart of an example method for generating timing information for a password.

FIG. 8 illustrates a flowchart of an example method 800 for generating timing information for a password. Method 800 will be described with reference to FIGS. 1 and 2 to provide a suitable example of how the method relates to the above description.

Method 800 includes an act 801 of receiving user input of a password, the password comprising a plurality of characters. For example, client computing device 102a can receive input of a password via a user interface 200. User interface 200 may be a webpage or other interface provided by server system 101 or configured to communicate with server system 101.

Method 800 includes an act 802 of determining when each of the plurality of characters is input while the password is input. For example, client computing device 102a (or user interface 200) can determine when each character of the password "12345" is input into password field 202.

Method 800 includes an act 803 of generating timing information which defines when each of the plurality of characters was input. For example, client computing device 102a (or user interface 200) can generate timing array 301 or information that can be used to generate timing array 301. Once the timing information is generated, client computing device 102a can use the timing information to store user credentials locally, perform an authentication process locally, or can send the timing information to server system 101 to create user credentials or to authenticate with server system 101.

In the above description, it is assumed that the timing array represents a duration of time between the input of each character of a particular password. For example, in FIG. 3, it is assumed that the individual characters of the password 12345 are input at 250 ms intervals. However, in some embodiments of the present invention, a timing array may be entered independent of, or even in place of, a password input. Accordingly, a timing array may be entered by means of any user input, including but not limited to a repeated entry of single character, repeated entry of one or more non-character keys, entry of a plurality of random characters and/or non-character keys, entry of a specified order of characters that is different from the user's password, and/or via a plurality of taps or other user contacts on a sensor surface of a computing device, such as a touchscreen or touch-sensing display on a personal computer, tablet, watch or phone device, or a touchpad having one or more touch-sensitive areas. In some embodiments, a user is required to input a password independent of a timing array, and is further required to input a timing array independent of a password. In some embodiments, a user is only required to input a timing array, wherein the timing array may be entered by any user input, as described herein. In some instances, a user is required to enter a password prior to entering a timing array. In some embodiments, a user is required to enter a timing array prior to entering a password.

In some instances, a user may enter a timing array concurrent with entering a password. In some instances, a user may not enter a timing array concurrent with entering a password.

Figure 9:
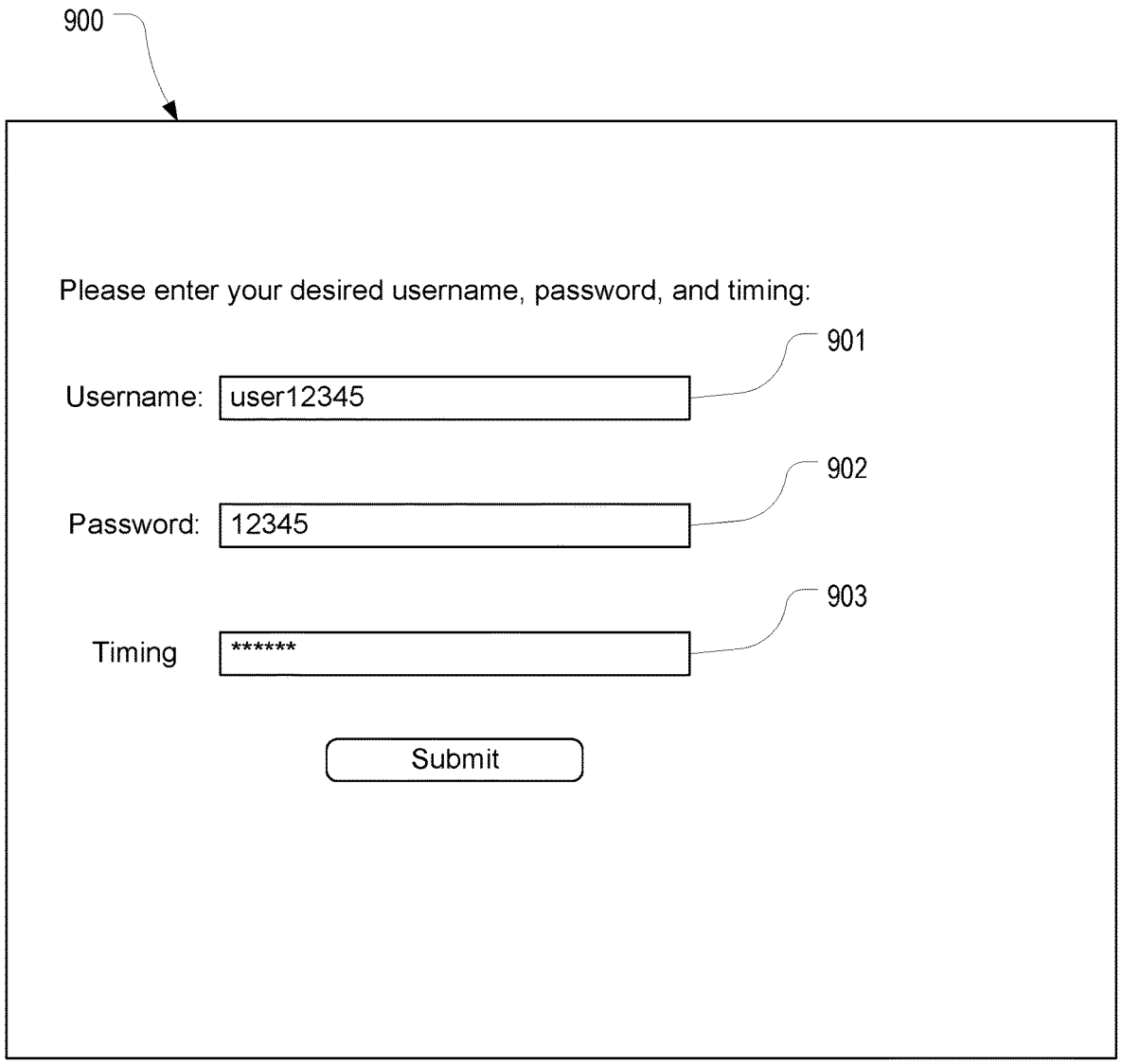
FIG. 9 illustrates a flowchart of an example of how a timing array that is independent of a password can be generated.

FIG. 9 illustrates an example of how a timing array that is independent of the password can be generated. FIG. 9 depicts a user interface 900 that is similar to user interface 200 of FIG. 2 in that user interface 900 includes fields 901 and 902 for receiving a username and password. However, unlike field 202, field 902 is assumed to not be configured to detect the timing of the input of the characters of the password. In other words, field 902 can function as a typical field for receiving a password.

In addition to fields 901 and 902, user interface 900 includes a timing field 903 in which the user can input any sequence of characters using a desired timing. In other words, timing field 903 can function in a similar manner as field 202 except that only the timing of the input is considered. In FIG. 9, it is assumed that the user has input a sequence of six characters with a duration of 250 milliseconds between each character. As a result and as represented in FIG. 10, a data structure 1000 can be created to store the multidimensional credentials. Although data structure 1000 appears similar to data structure 300, an important distinction exists. In data structure 1000, timing array 1001 is not associated with the password 12345. Instead, timing array 1001 represents the separate input of six characters in accordance with the defined timing. Timing array 1001 is therefore an independently verifiable credential of the user's multidimensional credentials. Although timing array 1001 is not associated with any particular sequence of characters, it is associated with a particular number of characters. In particular, timing array 1001 represents a sequence of any six characters.

After data structure 1000 is created, the user would be required to provide three different inputs to authenticate: the username user12345; the password 12345; and any six characters in accordance with the defined timing. These six characters could be six consecutive letters and or numbers, six presses of the space bar, enter key, backspace key, etc., or, in the case of a touch screen, six consecutive taps anywhere on the touch screen that is receiving input for the application requiring authentication. Accordingly, the user can be required to input a specific password with no particular timing in addition to a sequence containing the defined number of characters and at the defined timing.

Figure 11:
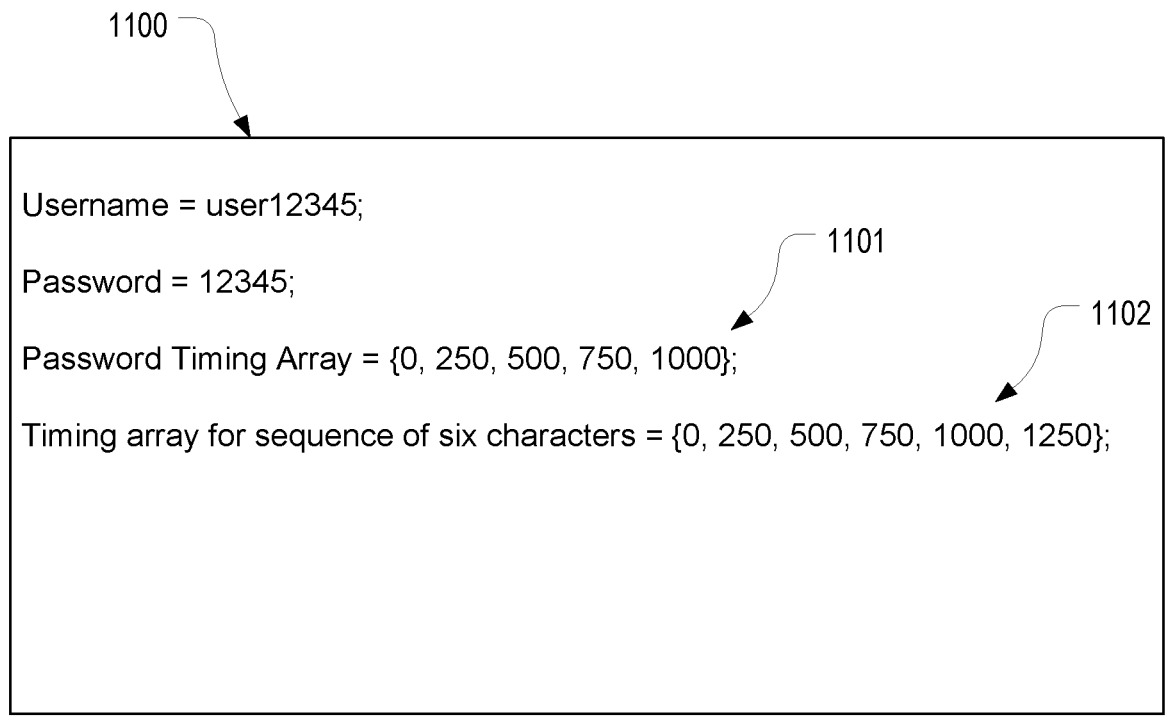
FIG. 11 illustrates a diagram featuring a data structure.

Although the above example assumes that the password is not associated with any particular timing, in some embodiments, the password may also be associated with a timing array. FIG. 11 provides an example of a data structure 1100 that can be created when the password is also associated with a timing array. As shown, data structure 1100 includes a timing array 1102 that is not associated with the password but represents the required timing of inputting a sequence of any six characters. Data structure 1100 also includes a password timing array 1101 that defines the required timing for inputting the characters of the password 12345. Accordingly, for the user to authenticate, he will be required to input the username, the password 12345 in accordance with the timing defined in password timing array 1101, and any sequence of six characters in accordance with the timing defined in timing array 1102.

In some embodiments, a user's multidimensional credentials may not even include a specific password. Instead, the multidimensional credentials may include a username and a timing array defining a required timing for inputting a sequence of any characters but of the required length. In such cases, the timing array alone can function like a password. Also, when a timing array that is independent of the password is employed, the same variance techniques and other variations described above can be employed.

Figure 12:
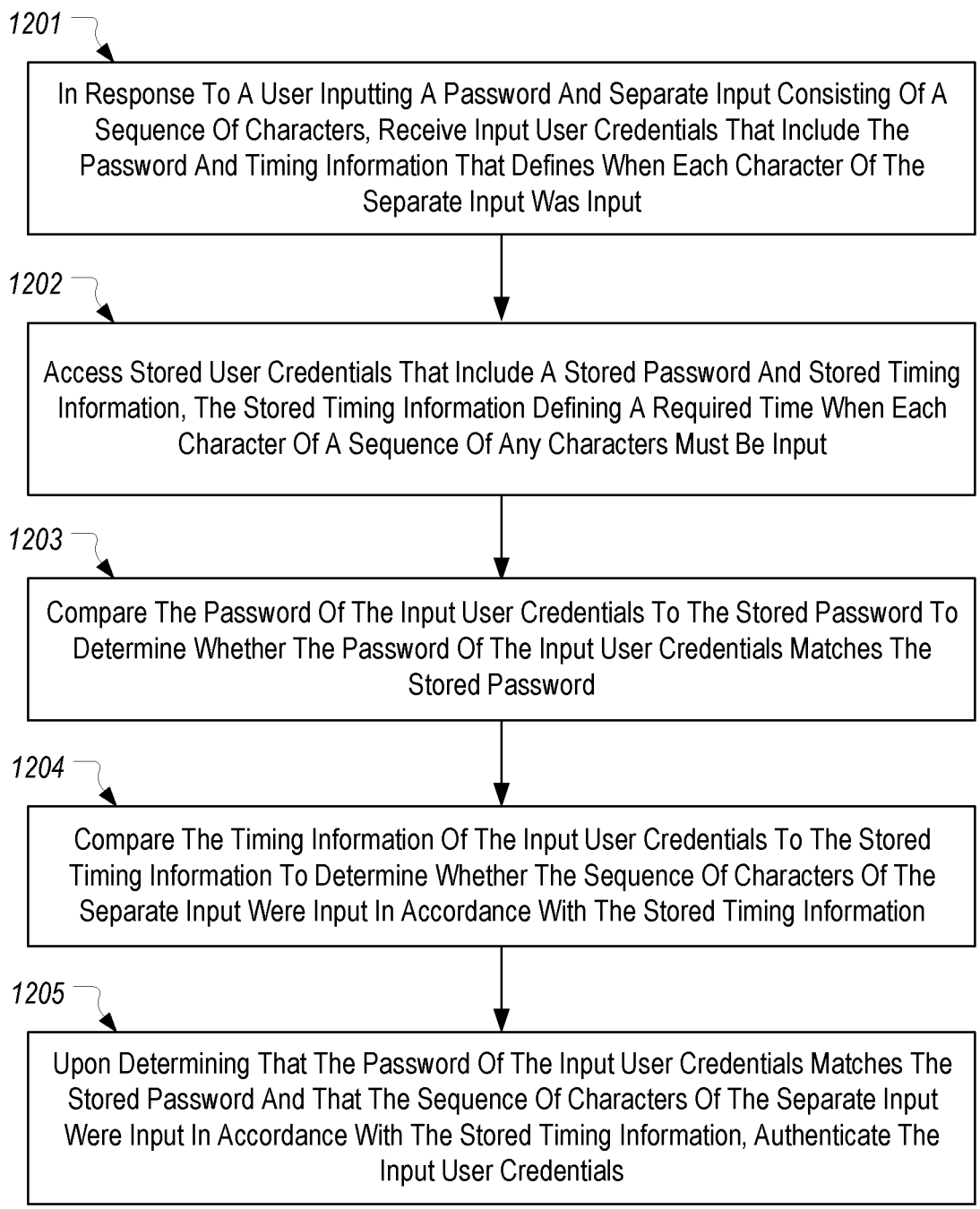
FIG. 12 illustrates a flowchart of an example method for authenticating user credentials.

FIG. 12 illustrates a flowchart of an example method 1200 for authenticating user credentials. Method 1200 will be described with reference to FIGS. 9 and 10 to provide a suitable example of how the method relates to the above description.

Method 1200 includes an act 1201 of, in response to a user inputting a password and separate input consisting of a sequence of characters, receiving input user credentials that include the password and timing information that defines when each character of the separate input was input. For example, in response to the user inputting the password 12345 and inputting a sequence of six characters, user credentials containing the password and a timing array defining when the sequence of six characters was input may be received.

Method 1200 includes an act 1202 of accessing stored user credentials that include a stored password and stored timing information, the stored timing information defining a required time when each character of a sequence of any characters must be input. For example, data structure 1000 could be accessed.

Method 1200 includes an act 1203 of comparing the password of the input user credentials to the stored password to determine whether the password of the input user credentials matches the stored password. For example, the received password could be compared to the password stored in data structure 1000.

Method 1200 includes an act 1204 of comparing the timing information of the input user credentials to the stored timing information to determine whether the sequence of characters of the separate input were input in accordance with the stored timing information. For example, the received timing array could be compared to the timing array stored in data structure 1000.

Method 1200 includes an act 1205 of, upon determining that the password of the input user credentials matches the stored password and that the sequence of characters of the separate input were input in accordance with the stored timing information, authenticating the input user credentials. For example, if the received password and timing array match the password and timing array stored in data structure 1000, the user can be authenticated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a computing system, for authenticating user credentials, the method comprising:
   receiving input user credentials that include a password and timing information, the timing information defining a time when individual elements of the password were input;
   accessing stored user credentials that include a stored password and stored timing information, the stored timing information defining a required time when individual elements of the stored password must be input, wherein the stored timing information comprises at least one of: i) one of absolute values when individual elements of the password must be input or relative values defining a duration between input of adjacent elements of the password, and the timing information of the input user credentials comprises the other of absolute values or relative values; ii) an average of timing information generated from multiple inputs of the stored password; and iii) a range for at least one element of the stored password, the range encompassing minimum and maximum values when the element was input during multiple inputs of the stored password;
   comparing the timing information of the input user credentials to the stored timing information to determine whether the individual elements of the password were input in accordance with the stored timing information; and
   upon determining that the individual elements of the password were input in accordance with the stored timing information, authenticating the input user credentials.

2. The method of claim 1, wherein the stored timing information defines the required time as a range of times within which an individual element must be input.

3. The method of claim 2, wherein the range of times is defined using a variance parameter.

4. The method of claim 1, wherein the input user credentials and the stored user credentials include a username.

5. The method of claim 1, wherein the stored timing information defines the required time as a duration of time between the input of adjacent elements.

6. The method of claim 1, wherein the stored timing information is stored separately from the stored password.

7. The method of claim 1, wherein the input user credentials are received from a computing device or from user input to a component of the computing system.

8. A method, implemented by a computing device with which a user inputs user credentials that include a password, for generating timing information for the password, the method comprising: receiving user input of a password, the password comprising a plurality of elements;
   while the password is input, determining when each of the plurality of elements is input; and
   generating timing information which defines when each of the plurality of elements was input, wherein the timing information comprises at least one of: i) one of absolute values when individual elements of the password must be input or relative values defining a duration between input of adjacent elements of the password, and the timing information of the input user credentials comprises the other of absolute values or relative values; ii) an average of timing information generated from multiple inputs of the stored password; and iii) a range for at least one element of the stored password, the range encompassing minimum and maximum values when the element was input during multiple inputs of the stored password.

9. The method of claim 8, further comprising at least one of:
   transmitting the timing information to another computing system in the form of a request to establish user credentials for authenticating with the computing system or in the form of a request to authenticate with the computing system;
   associating at least one variance parameter with the timing information; and
   comparing the timing information to stored timing information as part of an authentication process.

10. The method of claim 8, wherein the timing information defines at least one of:

a duration of time between the input of each set of adjacent elements in the plurality of elements; and an absolute time when each of at least a second element through a last element was input.

11. The method of claim 8, wherein receiving user input of the password comprises receiving user input of the password multiple times, and wherein the timing information is generated based on the multiple inputs of the password.

12. A server system comprising:

one or more processors; and computer readable media storing computer executable instructions which when executed implement a method for authenticating a user comprising:

receiving, from a first user interface displayed on a first client computing device, a first username, a first password, and first timing information defining when each element of the first password was input into the first user interface by a user;

storing the first username, first password, and first timing information as user credentials for the user for authenticating with the server system;

receiving, from another user interface displayed on a second client computing device, a second username, a second password, and second timing information defining when each element of the second password was input into the second user interface by the user;

comparing the second username, the second password, and the second timing information to the first username, the first password, and the first timing information; and upon determining that the second username, the second password, and the second timing information match the first username, the first password, and the first timing information, authenticating the user, wherein the first timing information comprises at least one of: i) one of absolute values when individual elements of the first password must be input or relative values defining a duration between input of adjacent elements of the first password, and the first timing information comprises the other of absolute values or relative values; ii) an average of timing information generated from multiple inputs of the first password; and iii) a range for at least one element of the first password, the range encompassing minimum and maximum values when the element of the first password was input during multiple inputs of the first password.

13. The server system of claim 12, wherein the first client computing device and the second client computing device are different client computing devices.

14. The server system of claim 12, wherein determining that the second timing information matches the first timing information comprises determining that each element of the second password was input within a variance of when the corresponding element of the first password was input.

* * * * *